(12) United States Patent
Zhou et al.

(10) Patent No.: US 8,982,913 B2
(45) Date of Patent: Mar. 17, 2015

(54) MULTIPLE E-CARRIER TRANSPORT OVER DSL

(75) Inventors: Xinkuan Zhou, Shekou (CN); Clifton Powers, Raleigh, NC (US); Laxman Anne, Eden Prairie, MN (US); Manish Sharma, Eden Prairie, MN (US); Joe Polland, Eden Prairie, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 581 days.

(21) Appl. No.: 12/468,552

(22) Filed: May 19, 2009

(65) Prior Publication Data

US 2009/0290603 A1 Nov. 26, 2009

Related U.S. Application Data

(60) Provisional application No. 61/055,353, filed on May 22, 2008.

(51) Int. Cl.
*H04J 3/02* (2006.01)
*H04J 3/16* (2006.01)
*H04J 3/04* (2006.01)

(52) U.S. Cl.
CPC ............... *H04J 3/1647* (2013.01); *H04J 3/04* (2013.01); *H04J 3/1641* (2013.01)
USPC ........................................................ 370/537

(58) Field of Classification Search
CPC .......... H04J 3/1647; H04J 3/04; H04J 3/1641
USPC .................................................. 370/532–543
See application file for complete search history.

(56) References Cited

U.S. PATENT DOCUMENTS

| 4,530,093 A | 7/1985 | Akram |
| 5,452,306 A | 9/1995 | Turudic et al. |

(Continued)

FOREIGN PATENT DOCUMENTS

| EP | 0760563 | 3/1997 |
| JP | 09139723 | 5/1997 |

OTHER PUBLICATIONS

Rup et al., "SHDSL Technology Complementing Other Transport Technologies", "EUROCON 2003. Computer as a Tool. The IEEE Region 8", Sep. 22, 2003, pp. 229-232, vol. 1, Publisher: IEEE , Published in: Piscataway, NJ.

(Continued)

*Primary Examiner* — Mang Yeung
(74) *Attorney, Agent, or Firm* — Fogg & Powers LLC (57) ABSTRACT

A communication system comprises a first multiplexer card having a first plurality of TDM ports and a first differential signaling interface, the first multiplexer card operable to map timeslots from the TDM ports to a first combined signal transmitted via the first differential signaling interface; a first unit coupled to the first differential signaling interface and configured to map timeslots extracted from the first combined signal to a DSL frame; a second unit coupled to the first unit via the a DSL link, the second unit having a third differential signaling interface and operable to map timeslots extracted from the DSL frame to a second combined signal; and a second multiplexer card having a second plurality of TDM ports and a fourth differential signaling interface, the second multiplexer card operable to map each of the timeslots from the second combined signal to one of the second plurality of TDM ports.

25 Claims, 4 Drawing Sheets

(56) References Cited

U.S. PATENT DOCUMENTS

| | | | |
|---|---|---|---|
| 5,506,956 A | 4/1996 | Cohen | |
| 5,526,344 A | 6/1996 | Diaz et al. | |
| 5,768,278 A | 6/1998 | Virdee et al. | |
| 5,771,236 A | 6/1998 | Sansom et al. | |
| 5,812,786 A | 9/1998 | Seaholtz et al. | |
| 5,881,059 A | 3/1999 | Deschaine et al. | |
| 5,953,318 A * | 9/1999 | Nattkemper et al. | 370/236 |
| 6,266,349 B1 * | 7/2001 | Fukui et al. | 370/515 |
| 6,320,876 B1 | 11/2001 | Virdee et al. | |
| 6,781,985 B1 | 8/2004 | Feder et al. | |
| 6,954,463 B1 | 10/2005 | Ma et al. | |
| 6,963,561 B1 * | 11/2005 | Lahat | 370/356 |
| 7,054,377 B1 * | 5/2006 | Betts | 375/265 |
| 7,088,742 B2 | 8/2006 | Oliver et al. | |
| 2002/0040381 A1 * | 4/2002 | Steiger et al. | 709/102 |
| 2002/0196813 A1 * | 12/2002 | Chow et al. | 370/474 |
| 2003/0058847 A1 * | 3/2003 | Pike | 370/360 |
| 2003/0123487 A1 | 7/2003 | Blackwell et al. | |
| 2004/0090985 A1 * | 5/2004 | Burkle et al. | 370/463 |
| 2004/0213170 A1 * | 10/2004 | Bremer | 370/282 |
| 2004/0264683 A1 * | 12/2004 | Bye | 379/402 |
| 2005/0100337 A1 | 5/2005 | DeCusatis et al. | |
| 2005/0210157 A1 * | 9/2005 | Sakoda | 709/251 |
| 2006/0233188 A1 | 10/2006 | Oliver et al. | |
| 2007/0140696 A1 * | 6/2007 | DeCusatis et al. | 398/98 |
| 2008/0130688 A1 | 6/2008 | Polland | |

OTHER PUBLICATIONS

U.S. Patent and Trademark Office, "Final Office Action", "U.S. Appl. No. 11/566,493", Sep. 30, 2009, pp. 1-23.

U.S. Patent and Trademark Office, "Final Office Action", "U.S. Appl. No. 11/566,493", Nov. 16, 2011, pp. 1-26.

U.S. Patent and Trademark Office, "Notice of Allowance", "U.S. Appl. No. 11/566,493", Jan. 12, 2012, pp. 1-7.

U.S. Patent and Trademark Office, "Notice of Allowance", "U.S. Appl. No. 11/566,493", May 16, 2012, pp. 1-11.

U.S. Patent and Trademark Office, "Office Action", "U.S. Appl. No. 11/566,493", Apr. 10, 2009, pp. 1-23.

U.S. Patent and Trademark Office, "Office Action", "U.S. Appl. No. 11/566,493", Feb. 23, 2010, pp. 1-25.

U.S. Patent and Trademark Office, "Office Action", "U.S. Appl. No. 11/566,493", Jun. 23, 2011, pp. 1-18.

U.S. Patent and Trademark Office, "Notice of Allowance", "U.S. Appl. No. 13/412,067", Nov. 13, 2012, pp. 1-25.

International Searching Authority, "International Search Report ", "from Foreign Counterpart of U.S. Appl. No. 11/566,493", May 16, 2008, pp. 1-6, Published in: WO.

State Service of Intellectual Property of Ukraine, "Decision on the Grant of a Patent for an Invention", "from Foreign Counterpart of U.S. Appl. No. 12/468,562", Jun. 21, 2012, pp. 1-4, Published in: UA.

U.S. Patent and Trademark Office, "Notice of Allowance", "U.S. Appl. No. 12/468,562", Oct. 1, 2012, pp. 1-8.

U.S. Patent and Trademark Office, "Office Action", "U.S. Appl. No. 12/468,562", Jan. 6, 2012, pp. 1-34.

International Searching Authority, "International Search Report ", "from Foreign Counterpart of U.S. Appl. No. 12/468,562", Mailed Jan. 15, 2010, pp. 1-11, Published in: WO.

U.S. Patent and Trademark Office, "Final Office Action", "U.S. Appl. No. 12/468,562", Jul. 17, 2012.

* cited by examiner

MULTIPLE E-CARRIER TRANSPORT OVER DSL

CROSS-REFERENCE TO RELATED CASES

This application is related to the following co-pending United States patent applications, all of which are hereby incorporated herein by reference:

U.S. patent application Ser. No. 12/468,562 (entitled "SYSTEM AND METHOD FOR MULTIPLEXING FRACTIONAL TDM FRAMES") filed on even date herewith and which is referred to herein as the '1063 Application;

U.S. patent application Ser. No. 11/566,493 entitled "POINT-TO-MULTIPOINT DATA COMMUNICATIONS WITH CHANNEL ASSOCIATED SIGNALING" filed on Dec. 4, 2006 and which is referred to herein as the '801 application; and U.S. provisional patent application Ser. No. 61/055,353, filed May 22, 2008 entitled "E1 TRANSPORT OVER G.SHDSL," and referred to herein as the "'353 application". The present application hereby claims priority, under 35 U.S.C. §119(e), to U.S. Provisional Patent Application No. 61/055,353.

BACKGROUND

Many telecommunications services utilize time division protocols such as E-carrier and T-carrier protocols. For example, E-carrier systems allocate bandwidth or timeslots for a voice call for the entire duration of the call. Thus, E-carrier systems provide high call quality since the bandwidth and system latency is constant and predictable. However, this also increases the cost of utilizing E-carrier systems due to the persistent allocation of bandwidth. In particular, individuals and small business often find the cost of an E-carrier service to be cost-prohibitive despite its benefits.

SUMMARY

In one embodiment a communication system is provided. The communication system comprises a first multiplexer card having a first plurality of time division multiplex (TDM) ports and a first differential signaling interface, wherein the first multiplexer card is operable to map timeslots from each of the first plurality of TDM ports to a first combined signal transmitted via the first differential signaling interface; a first unit having a second differential signaling interface coupled to the first differential signaling interface, wherein the first unit is operable to extract the timeslots from the first combined signal and to map the extracted timeslots to a digital subscriber line (DSL) frame for transmission over a DSL link; a second unit coupled to the first unit via the DSL link, the second unit having a third differential signaling interface, wherein the second unit is operable to extract the timeslots in the DSL frame and to map the timeslots to a second combined signal transmitted via the third differential signaling interface; and a second multiplexer card having a second plurality of TDM ports and a fourth differential signaling interface, wherein the second multiplexer card is operable to map each of the timeslots from the second combined signal to one of the second plurality of TDM ports.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The embodiments described below help reduce the cost of an E-carrier or T-carrier service by providing multiple interfaces to remote locations without requiring hardware changes or upgrades to the line cards in central and remote digital subscriber line (DSL) units. In addition, the embodiments described below enable transporting multiple fractional E-carrier or T-carrier signals over the same DSL pair.

Figure 1:
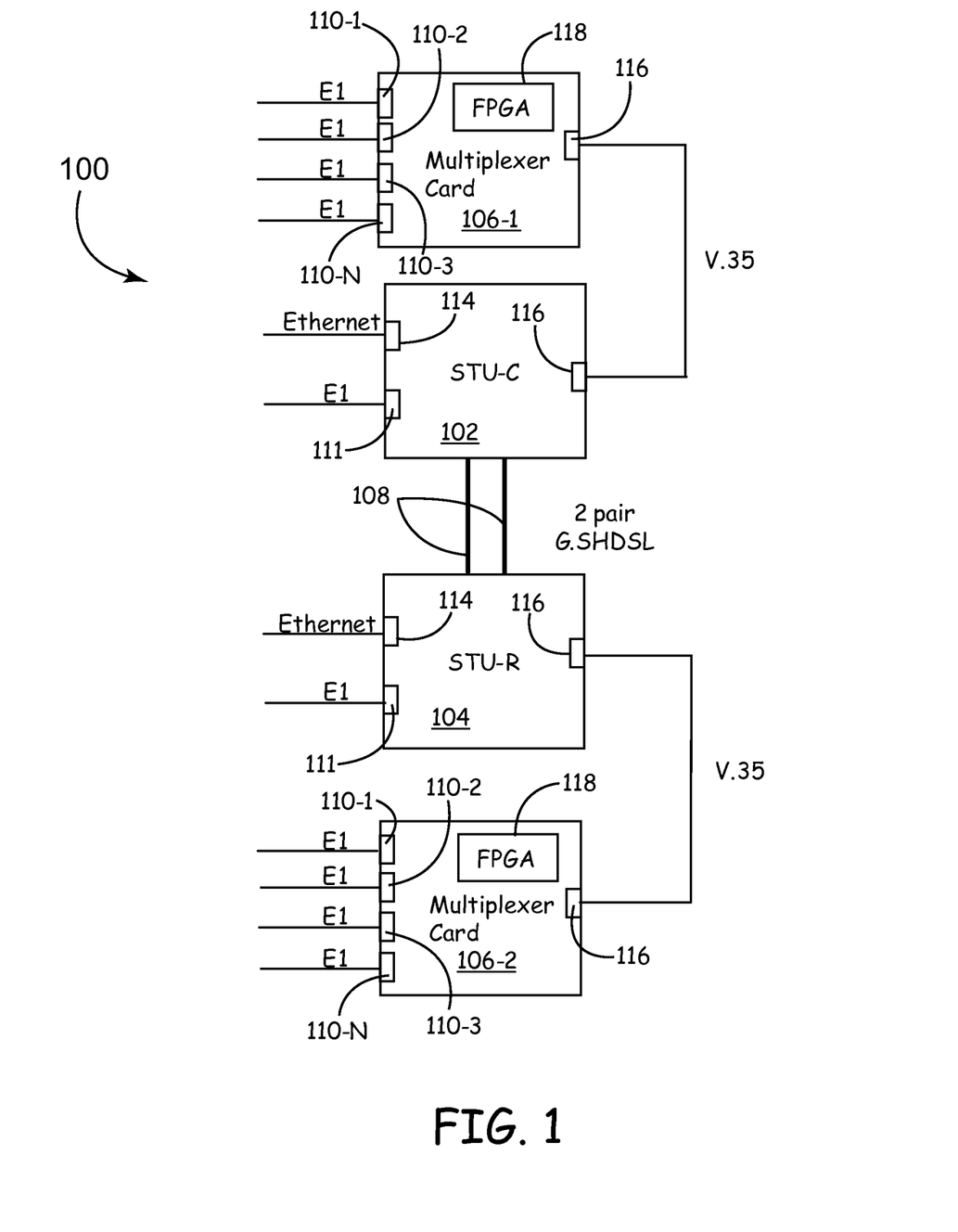
FIG. 1 is a block diagram of one embodiment of a communication system.

FIG. 1 is a block diagram of one embodiment of a communication system 100 that enables communication signals from a plurality of Time Division Multiplex (TDM) ports 110 to be transmitted over a Digital Subscriber Line (DSL) link 108. As used herein, a TDM port is a port configured to transmit and receive TDM frames. A TDM frame, as used herein, is a frame configured according to one of an E-carrier protocol and a T-carrier protocol. E-carrier and T-carrier protocols are known to one of skill in the art. In particular, the embodiments described herein implement the E1 protocol defined in the International Telecommunications Union (ITU) G.703 standard. However, it is to be understood that other E-carrier and T-carrier protocols can be used in other embodiments. In addition, as used herein, a fractional TDM frame is a TDM frame in which less than the total number of available timeslots in the frame are used for carrying user data.

System 100 includes a remote unit 104 (labeled as STU-R) coupled to a central unit 102 (labeled as STU-C) over the DSL link 108. In this exemplary embodiment, the Global.Standard High-Bit-Rate Digital Subscriber Line (G.SHDSL), defined in the ITU G.991.2 standard, is used for the DSL link 108. However, it is to be understood that other DSL variants can be used in other embodiments. The remote unit 104 and the central unit 102 each include a differential signaling interface 116 which is coupled to a differential signaling interface 116 of a multiplexer card 106. In this exemplary embodiment, the differential signaling interface 116 is implemented according to the International Telecommunication Union (ITU) V.35 standard. However, it is to be understood that other differential signaling interfaces can be used in other embodiments. For example, the ITU V.11 standard or the Electronic Industries Alliance (EIA) 485 standard can be used in other embodiments. Various connectors can be used with the above differential signaling interfaces such as, but not limited to, the connectors defined by the EIA-530 or EIA-449 standards.

Multiplexer cards 106-1 and 106-2 each include a plurality of TDM ports 110 and a differential signaling interface 116. In particular, in the exemplary embodiment shown in FIG. 1, each multiplexer card 106 includes 4 TDM ports 110. Each TDM port can be configured for full or fractional TDM frames. The multiplexer cards 106 combine the TDM frames from the TDM ports 110 into a single continuous data stream that is transmitted over the differential signaling interface 116. In addition, the multiplexer cards 106 separate a continuous data stream received over the differential signaling interface 116 into TDM frames provided to the respective TDM port 110.

Figure 2:
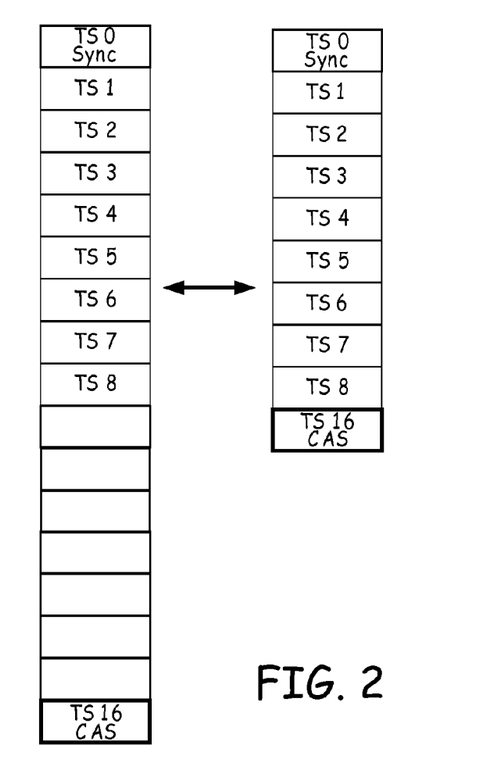
FIG. 2 is a diagram depicting remapping of an exemplary fractional TDM frame.

Each TDM port 110 can be configured for structured or unstructured operation. Structured operation refers to transmitting and receiving structured TDM frames which have a specified number of timeslots in each frame. In structured mode, each TDM port 110 can be configured for fractional TDM frames, with a specified number of timeslots. Error checking mechanisms, such as Cyclic Redundancy Check-4 (CRC-4), known to one of skill in the art can be enabled/disabled. Channel Associated Signaling (CAS) in timeslot 16 of each TDM frame can be enabled or disabled as well. CAS signaling is known to one of skill in the art. When CAS signaling is disabled, timeslot 16 is treated as a normal payload timeslot. When CAS signaling is enabled, pass-through of the CAS signaling can be used, or an idle code can be configured and inserted in the CAS timeslot 16. When fractional TDM frames are configured, the multiplexer cards 106 are configured, in some embodiments, for CAS timeslot remapping. In CAS timeslot remapping, the CAS signaling timeslot 16 is remapped as the timeslot following the last timeslot carrying user data as shown in FIG. 2. Additional details of CAS timeslot remapping are found in the '801 application. In unstructured mode, TDM ports 110 operate at 2 Mbits/sec unframed. In other words, in unstructured mode, TDM ports 110 transmit and receive unframed TDM timeslots at a rate of 2 Mbits/sec.

The differential signaling interface 116 is configured to operate at a data rate that will allow transport of all configured TDM ports 110, plus any overhead. A timeslot map is defined for the TDM ports 110 that are combined and transmitted over the differential signaling interface 116. No rigid mapping rules are adopted, which enables flexibility in the number of ports, order of ports, and number of timeslots that may be transported over the differential signaling interface 116. The timeslot map may be created via STU-C/STU-R craft menu screens, or via a menu screen of the multiplexer cards 106-1, and distributed to each device. A consistent timeslot map between each device in system 100 is maintained for proper operation. In some embodiments, the timeslot map is automatically created after configuring each TDM port 110. The timeslot map is then passed to the other devices (e.g. central unit 102 and remote unit 104) along with configuration information. The timeslot map defines the amount of traffic on the differential signaling interface 116 and is used as the basis for calculating the data rate of the differential signaling interface 116.

In the exemplary embodiment of FIG. 1, each multiplexer card 106 includes a Field Programmable Gate Array (FPGA) 118 that is responsible for timeslot mapping, E1 framing, CRC-4 handling, E1 alarms, Timeslot 16/CAS handling, and V.35 signal generation and termination. However, it is to be understood that in other embodiments, other programmable logic devices are used, such as, but not limited to, a complex programmable logic device (CPLD), a field programmable object array (FPOA), and a digital signal processor (DSP).

The differential signaling interface 116 is an unframed interface in this example. Hence, data is transmitted and received as a continuous stream of bytes without any explicit frame delineation inherent in the signal. In this embodiment, TDM ports 110 can be configured in structured or unstructured mode as described above. In structured mode, the TDM signals are framed data streams. The system 100 is configured to identify an origin (e.g. start of the multiplexed signal on the differential signaling interface 116). A timeslot map is used together with the knowledge of the origin to locate each data stream. Even if all TDM ports 110 are configured in unstructured mode, the system 100 uses a defined map and origin to locate each TDM stream within the combined signal transported on the differential signaling interface 116. Since the differential signaling interface 116 is an unframed interface, the differential signaling interface 116 is assigned a data rate based on the timeslot map. For example, a time slot map of 32 timeslots is assigned a data rate of 2 Mbits/sec.

Figure 3:
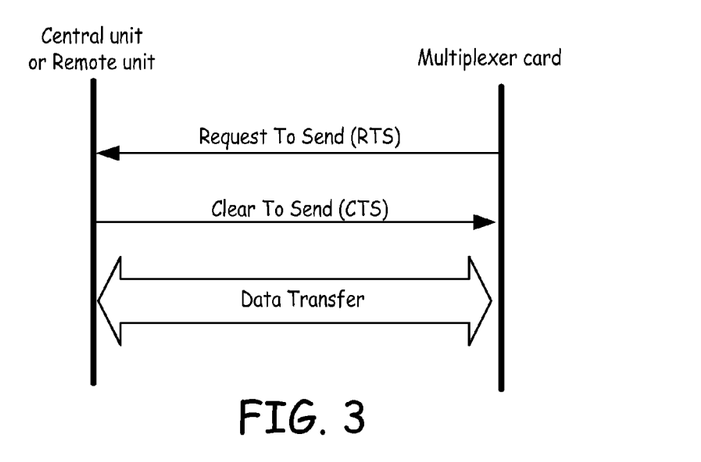
FIG. 3 is a flow diagram depicting one embodiment of an initialization sequence.

In some embodiments, prior to transmitting any data, each multiplexer card 106 transmits its request to send (RTS) signal over the differential signaling interface as shown in FIG. 3. On receipt of the RTS signal, the corresponding central unit 102 or remote unit 104 responds with a clear to send (CTS) signal as shown in FIG. 3. After the CTS signal is sent, both the multiplexer card 106 and corresponding central unit 102 or remote unit 104 can send data. The first byte sent from either side is the first byte of the timeslot map. All subsequent data is relative to the transmission of the first byte and no explicit framing information is included. If one side looses synchronization or can no longer locate its position in the map, RTS and CTS signals can be used to resynchronize.

In other embodiments, High-level Data Link Control (HDLC) encoding is used to identify the origin or start of the signal. HDLC encoding can be implemented as bit-oriented or byte-oriented HDLC encoding. For example, bit-oriented HDLC encoding involves appending a two byte cyclic redundancy check (CRC) using the polynomial X16+X12+X5+1. Each of the TDM frames are then examined for a continuous bit sequence of five 1's (that is, 11111). A zero is inserted at the end of each sequence of five 1's (that is, 111110). HDLC flags with the pattern "01111110" are also inserted at the beginning and end of the combined signal containing the TDM signals from each of the TDM ports 110. Zero insertion after a sequence of five 1s in the payload is used to avoid confusion of payload with HDLC flags. The HDLC flags are used to identify the start and end of the combined signal.

Once the start of the combined signal has been identified via HDLC flags or RTS/CTS signaling, the timeslot map is used to identify the location of individual TDM signals and timeslots. The maximum size of the timeslot map is N×32 timeslots where N is the number of full TDM frames supported. Smaller timeslot maps are also possible, and are created for configurations with less ports or fractional ports.

The TDM ports 110 can be located within the timeslot map in any order. Additionally, each TDM port 110 can be configured as full or fractional, and structured or unstructured. For example, Table 1 shows a timeslot map with TDM ports inserted in order—110-1 (labeled E1 in Table 1), 110-2 (labeled E2 in Table 1), 110-3 (labeled E3 in Table 1), and 110-N (labeled E4 in Table 1). All TDM ports 110 are full E1's in structured mode in Table 1. In Table 1, F is the framing/synch byte (timeslot 0) and C is the CAS signaling byte (timeslot 16) for each TDM port 110.

TABLE 1

| F | E1 | E1 | E1 | E1 | E1 | E1 | E1 | E1 | E1 | E1 | E1 | E1 | E1 | E1 | E1 |
|---|----|----|----|----|----|----|----|----|----|----|----|----|----|----|----|
| C | E1 | E1 | E1 | E1 | E1 | E1 | E1 | E1 | E1 | E1 | E1 | E1 | E1 | E1 | E1 |
| F | E2 | E2 | E2 | E2 | E2 | E2 | E2 | E2 | E2 | E2 | E2 | E2 | E2 | E2 | E2 |
| C | E2 | E2 | E2 | E2 | E2 | E2 | E2 | E2 | E2 | E2 | E2 | E2 | E2 | E2 | E2 |
| F | E3 | E3 | E3 | E3 | E3 | E3 | E3 | E3 | E3 | E3 | E3 | E3 | E3 | E3 | E3 |
| C | E3 | E3 | E3 | E3 | E3 | E3 | E3 | E3 | E3 | E3 | E3 | E3 | E3 | E3 | E3 |
| F | E4 | E4 | E4 | E4 | E4 | E4 | E4 | E4 | E4 | E4 | E4 | E4 | E4 | E4 | E4 |
| C | E4 | E4 | E4 | E4 | E4 | E4 | E4 | E4 | E4 | E4 | E4 | E4 | E4 | E4 | E4 |

Another exemplary timeslot map is shown in Table 2. In table 2, only 2 TDM ports 110-2 and 110-N are configured. TDM port 110-N is configured in unstructured mode and is inserted into the map first. Therefore, bandwidth for a full 32 timeslots must be allocated to the unstructured signal (labeled as U4). The TDM port 110-N is followed by the TDM port 110-2 that is configured as a fractional TDM port with 8 timeslots (labeled as E2). As with the timeslot map in Table 1, F represents the framing/synch byte (timeslot 0) and C represents the CAS signaling byte (timeslot 16) for the structured TDM port 110-2. Additionally, in Table 2, CAS timeslot 16 remapping is used for TDM port 110-2 as described above and in the '801 application. In this example, timeslot 0, the framing byte, of the structured TDM frame is not dropped and is included in the data transfer.

TABLE 2

| U4 | U4 | U4 | U4 | U4 | U4 | U4 | U4 | U4 | U4 | U4 | U4 | U4 | U4 | U4 | U4 |
|----|----|----|----|----|----|----|----|----|----|----|----|----|----|----|----|
| U4 | U4 | U4 | U4 | U4 | U4 | U4 | U4 | U4 | U4 | U4 | U4 | U4 | U4 | U4 | U4 |
|    |    |    | F  | E2 | E2 | E2 | E2 | E2 | E2 | E2 | E2 | C  |    |    |    |

Figure 4:
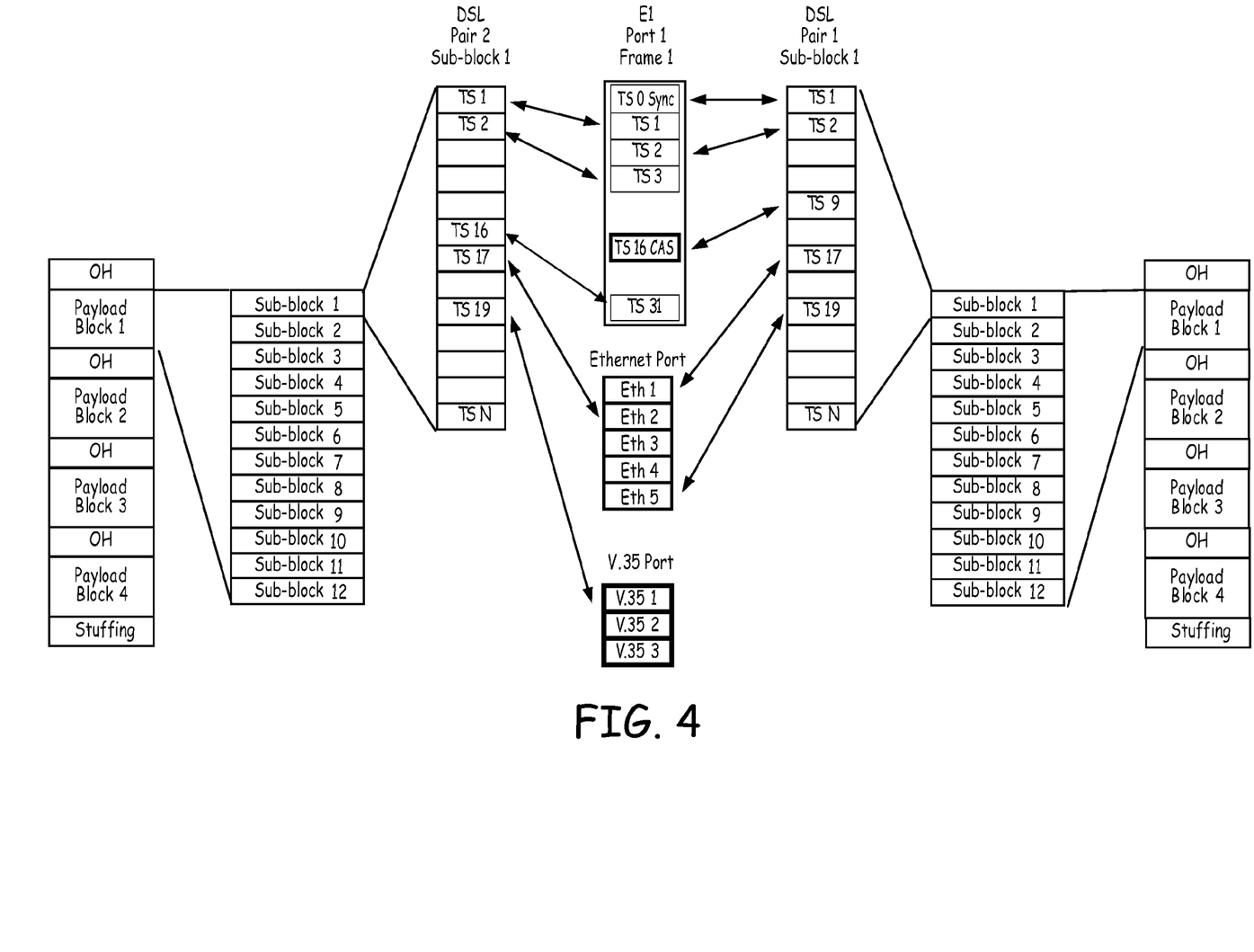
FIG. 4 depicts an exemplary mapping of signals to a DSL frame.

The central unit 102 and the remote unit 104 map the combined signals received over the differential signaling interface 116 from the respective multiplexer card 106 to a DSL frame. One exemplary embodiment of the timeslot mapping on the DSL link 108 between the central unit 102 and the remote unit 104 is shown in FIG. 4. As discussed above, in this exemplary embodiment, the G.SHDSL standard is used for DSL communications. Each of the central unit 102 and the remote unit 104, in this example, is configured with an E1 interface 111, an Ethernet interface 114, and the differential signaling interface 116, which is a V.35 interface in this example. The DSL interface, in the embodiment of FIG. 4, is operating in M-Pair mode, where M=2 (i.e. 2-pair mode). As described above, the central unit 102 and remote unit 104 are coupled to a respective multiplexer card 106 via the differential signaling interface 116. Since, the V.35 signal is a continuous byte stream, the central unit 102 and remote unit 104 map the V.35 signal to a DSL frame by knowing when the V.35 signal starts and the data rate assigned to the differential signaling interface 116. The DSL interface is allocated timeslots for the V.35 signal, based on the data rate of the differential signaling interface 116. Based on the allocated DSL timeslots, the V.35 byte stream is mapped to DSL timeslots as shown in the exemplary embodiment of FIG. 4.

In this exemplary embodiment, interfaces are mapped into G.SHDSL in the following order: E1, Ethernet, and differential signaling interface (V.35 in this example). All the E1 timeslots from E1 interface 111 are mapped into the G.SHDSL frame first. Then all the Ethernet timeslots from the Ethernet interface 114 are mapped into the G.SHDSL frame, followed by all the timeslots extracted from the differential signaling interface 116. It is to?? understood that the mapping order of the interfaces can be different in other embodiments However, if an E1 interface 111 is configured on the central unit 102 and the central unit 104, the E1 interface is typically inserted first into the G.SHDSL frame.

In this exemplary embodiment, timeslot mapping is interleaved between the two G.SHDSL pairs (DSL pair 1 and DSL pair 2), which creates a doubling of the throughput by using 2-pairs versus using a single pair DSL link. For example, as shown in FIG. 4, timeslot 0 from the E1 interface 111 is mapped to DSL pair i/sub-block 1/timeslot 1. Timeslot 1 from the E1 interface 111 is mapped to DSL pair 2/sub-block 1/timeslot 1 and timeslot 2 from the E1 interface 111 is mapped to DSL pair i/sub-block 1/timeslot 2. This interleaving continues until all the timeslots from the first E1 frame on E1 interface 111 are mapped. After mapping the first E1 frame from E1 interface 111, the timeslots from the first frame of Ethernet interface 114 are interleaved between the DSL pair 1 and the DSL pair 2 in a similar manner. After mapping the Ethernet interface 114 timeslots from the first Ethernet frame, the timeslots extracted from the differential signaling interface 116 are interleaved in a similar manner between the DSL pairs 1 and 2 until sub-block 1 is filled on both DSL pair 1 and DSL pair 2.

The sub-block size reflects the amount of data to be transferred. In particular, in a G.SHDSL frame, there are 12 sub-blocks per block, and there are 4 blocks for a total of 48 sub-blocks per DSL frame, as shown in FIG. 4. The sub-block size is calculated to incorporate a frame from the E1 interface 111, the Ethernet interface 114 and a complete timeslot map from the differential signaling interface 116. Each of the interfaces is allocated a specified number of timeslots in each sub-block. Thus, once sub-block 1 is filled, timeslots are mapped to the following sub-block. When mapping interleaved timeslots from the DSL pairs to the corresponding interface, the central unit 102 and the remote unit 104 de-interleave the timeslots to place them in the original order.

Figure 5:
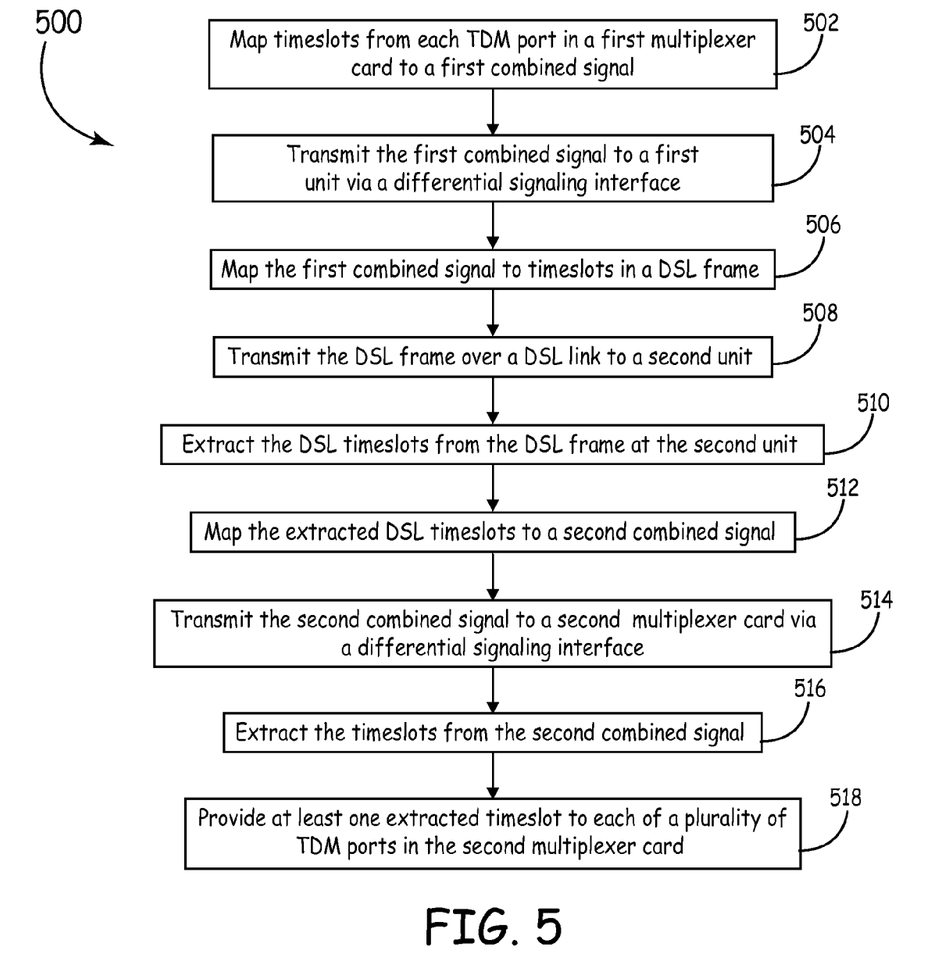
FIG. 5 is a flow diagram depicting one embodiment of a method of transporting signals from a plurality of time division multiplex (TDM) ports over a digital subscriber line (DSL) link.

FIG. 5 is a flow chart depicting one embodiment of a method 500 of transporting signals from a plurality of TDM ports over a DSL. At block 502, a first multiplexer card maps at least one timeslot from each of the plurality of TDM ports into a first combined signal. As discussed above, in this embodiment, each of the TDM ports is configured to transmit and receive TDM frames according to the International Telecommunications Union (ITU) G.703 standard. In addition, in some embodiments, mapping the timeslots to the first combined signal includes bit stuffing or byte stuffing the signal and inserting HDLC flags at the beginning and end of the first combined signal as discussed above.

At block 504, the first combined signal is transmitted over a differential signaling interface in the first multiplexer card to a differential signaling interface in a first unit, such as the central unit 102. The differential signaling interface is configured according to the International Telecommunication Union (ITU) V.35 standard in this embodiment. In some embodiments, transmitting the first combined signal via the differential signaling interface includes transmitting a request to send (RTS) signal over the differential signaling interface and waiting for a clear to send (CTS) in response to the RTS signal prior to transmitting the first combined signal over the differential signaling interface.

At block 506, the first unit maps the first combined signal to timeslots in a DSL frame. In some embodiments, mapping the first combined signal comprises interleaving the first combined signal between timeslots in a first DSL frame on a first DSL pair and timeslots in a second DSL frame on a second DSL pair. In addition, in some embodiments the first unit also includes an Ethernet port and an additional TDM port. Signals from the Ethernet port and the additional TDM port are also interleaved between timeslots in the first DSL frame and the second DSL frame as discussed above.

At block 508, the DSL frames are transmitted over a DSL link to a second unit, such as remote unit 104. At block 510, the second unit extracts the DSL timeslots that correspond to the timeslots from the plurality of TDM ports in the first multiplexer card. The second unit also extracts the signals from the Ethernet port and the additional TDM port in the first unit. At block 512, the second unit maps the extracted timeslots to a second combined signal. The second unit also maps signals from the Ethernet port and the additional TDM port to corresponding ports in the second unit (e.g. E1 port 111 and Ethernet port 114). At block 514, the second unit transmits the second combined signal to a second multiplexer card via a differential signaling interface. At block 516, the second multiplexer card extracts the timeslots from the second combined signal. At block 518, at least one timeslot is provided to each of a plurality of TDM ports in the second multiplexer card. It is to be understood that while method 500 is described in relation to a single direction, method 500 can be used for bi-directional communication between the first and second units.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A communication system comprising:
a first multiplexer card having a first plurality of time division multiplex (TDM) ports and a first differential signaling interface, wherein the first multiplexer card is operable to map timeslots from each of the first plurality of TDM ports to a first combined signal transmitted via the first differential signaling interface;
a first unit with circuit separate from and coupled to the first multiplexer card, the first unit having a second differential signaling interface coupled to the first differential signaling interface, wherein the first unit is operable to extract the timeslots from the first combined signal based on a timeslot map that is used for calculating a data rate of the second differential signaling interface and to map the extracted timeslots to a digital subscriber line (DSL) frame for transmission over a DSL link;
a second unit with circuit coupled to the first unit via the DSL link, the second unit having a third differential signaling interface, wherein the second unit is operable to extract the timeslots in the DSL frame and to map the timeslots to a second combined signal transmitted via the third differential signaling interface; and
a second multiplexer card separate from and coupled to the second unit, the second multiplexer card having a second plurality of TDM ports and a fourth differential signaling interface coupled to the third differential signaling interface, wherein the second multiplexer card is operable to map each of the timeslots from the second combined signal to one of the second plurality of TDM ports~
wherein a TDM port is a port configured to transmit and receive signal configured according to one of an E-carrier protocol and a T-carrier protocol;
wherein the first unit is located in a first location and the second unit is located in a second location different from the first location.

2. The communication system of claim 1, wherein each TDM port of the first and second plurality of TDM ports is configured to transmit and receive TDM frames according to the International Telecommunications Union (ITU) G.703 standard.

3. The communication system of claim 1, wherein each TDM port of the first and second plurality of TDM ports is configured for one of structured and unstructured operation.

4. The communication system of claim 1, wherein at least one TDM port of each of the first and second plurality of TDM ports is configured to transmit and receive fractional TDM frames.

5. The communication system of claim 1, wherein each differential signaling interface is configured according to the International Telecommunication Union (ITU) V.35 standard.

6. The communication system of claim 1, wherein each of the first multiplexer card, the first unit, the second unit, and the second multiplexer cards are operable to insert High-level Data Link Control (HDLC) flags at the beginning and end of each combined signal transmitted over the respective differential signaling interfaces.

7. The communication system of claim 1, wherein each of the first multiplexer card, the first unit, the second unit, and the second multiplexer card are operable to transmit a request to send (RTS) signal over the differential signaling interface and to wait for a clear to send (CTS) in response to the RTS signal prior to transmitting each combined signal over the respective differential signaling interfaces.

8. The communication system of claim 1, wherein each of the first unit and the second unit include a TDM port and an Ethernet port; wherein each of the first unit and the second unit are further operable to map timeslots from the TDM port and the Ethernet port to the DSL frame.

9. The communication system of claim 1, wherein the first unit and the second unit are configured according to the Global.Standard High-Bit-Rate Digital Subscriber Line (G.SHDSL) standard.

10. The communication system of claim 1, wherein the first unit and the second unit are operable to map timeslots to a DSL frame by interleaving the timeslots between a first DSL frame on a first DSL pair and a second DSL frame on a second DSL pair.

11. A multiplexer card comprising:
a plurality of time division multiplex (TDM) ports, wherein a TDM port is a port configured to transmit and receive signals configured according to one of an E-carrier protocol and a T-carrier protocol;
an unframed differential signaling interface; and
a logic unit with circuit operable to map timeslots from each of the plurality of TDM ports to a combined continuous data stream transmitted via the differential signaling interface based on a timeslot map that is used for calculating a data rate of the differential signaling interface; and to map each timeslot in a continuous data stream received over the differential signaling interface to one of the plurality of TDM ports;
wherein the continuous data stream contains a stream of bytes without explicit frame delineation inherent in the stream of bytes.

12. The multiplexer card of claim 11, wherein the logic unit comprises one of a field programmable gate array (FPGA), a field programmable object array (FPOA), a digital signal processor (DSP), and a complex programmable logic device (CPLD).

13. The multiplexer card of claim 11, wherein each of the plurality of TDM ports is configured to transmit and receive TDM frames according to the International Telecommunications Union (ITU) G.703 standard.

14. The multiplexer card of claim 11, wherein each of the plurality of TDM ports is configured for one of structured and unstructured operation.

15. The multiplexer card of claim 11, wherein at least one of the TDM ports is configured to transmit and receive fractional TDM frames.

16. The multiplexer card of claim 11, wherein the differential signaling interface is configured according to the International Telecommunication Union (ITU) V.35 standard.

17. The multiplexer card of claim 11, wherein the logic unit is operable to insert High-level Data Link Control (HDLC) flags at the beginning and end of the combined signal.

18. The multiplexer card of claim 11, wherein the logic unit is operable to transmit a request to send (RTS) signal over the differential signaling interface and to wait for a clear to send (CTS) in response to the RTS signal prior to transmitting the combined signal over the differential signaling interface.

19. A method of transporting signals from a plurality of time division multiplex (TDM) ports over a digital subscriber line (DSL) link, wherein a TDM port is a port configured to transmit and receive signals configured according to one of an E-carrier protocol and a T-carrier, the method comprising:
mapping at least one timeslot from each of the plurality of TDM ports to a first combined signal in a first multiplexer card based on a timeslot map that is used for calculating a data rate of a differential signaling interface;
transmitting the first combined signal to a first unit via the differential signaling interface in the first multiplexer card, wherein the first unit is separate from and coupled to the first multiplexer card, the first unit located in a first location;
mapping the first combined signal to timeslots in a DSL frame at the first unit;
transmitting the DSL frame over the DSL link to a second unit, the second unit located in a second location different from the first location;
extracting the DSL timeslots, which correspond to the timeslots from the plurality of TDM ports in the first multiplexer card, from the DSL frame at the second unit;
mapping the extracted DSL timeslots to a second combined signal at the second unit;
transmitting the second combined signal to a second multiplexer card via a differential signaling interface in the second unit;
extracting the timeslots from the second combined signal at the second multiplexer card; and
providing at least one extracted timeslot to each of a plurality of TDM ports in the second multiplexer card.

20. The method of claim 19, wherein the differential signaling interface is configured according to the International Telecommunication Union (ITU) V.35 standard.

21. The method of claim 19, wherein each of the plurality of TDM ports in the first and second multiplexer cards is configured to transmit and receive TDM frames according to the International Telecommunications Union (ITU) G.703 standard.

22. The method of claim 19, wherein the first and second units are configured according to the Global.Standard High-Bit-Rate Digital Subscriber Line (G.SHDSL) standard.

23. The method of claim 19, wherein mapping at least one timeslot from each of the plurality of TDM ports to the first combined signal in the first multiplexer card comprises inserting High-level Data Link Control (HDLC) flags at the beginning and end of the first combined signal.

24. The method of claim 19, wherein transmitting the first combined signal to the first unit via the differential signaling interface in the first multiplexer card includes:
transmitting a request to send (RTS) signal over the differential signaling interface; and waiting for a clear to send (CTS) in response to the RTS signal prior to transmitting the
first combined signal over the differential signaling interface.

25. The method of claim 19, wherein mapping the first combined signal to timeslots in a DSL frame at the first unit includes by interleaving the first combined signal between timeslots in a first DSL frame on a first DSL pair and timeslots in a second DSL frame on a second DSL pair.

* * * * *